United States Patent Office 3,565,520
Patented Feb. 23, 1971

3,565,520
PROJECTOR FOR THE REPRESENTATION OF REVOLVING BODIES OF ROTATION
Horst Raff, Wolfgang Roos, and Rudi Winzer, Oberkochen, Germany, assignors to Carl Zeiss-Stiftung, doing business as Carl Zeiss, Heidenheim (Brenz), Wurttemberg, Germany, a corporation of Germany
Filed Sept. 23, 1968, Ser. No. 761,658
Claims priority, application Germany, Sept. 23, 1967, P 15 72 905.2
Int. Cl. G02b 27/22; G03b 21/32
U.S. Cl. 352—86   5 Claims

ABSTRACT OF THE DISCLOSURE

A projector for the stereoscopic representation of revolving bodies of rotation, in which a continuously moving tape carrying a picture of the body of rotation made in accordance wth Mercator's projection is caused to move in a picture plane behind a projection objective producing a strong pin-cushion distortion. The conveying mechanism for the picture tape is rotated with the moving tape about the optical axis of said projection objective.

---

The invention relates to a device for the stereoscopic representation of revolving bodies of rotation by projection. A principal field of application for a projector of the type indicated are projection planetaria, in which individual celestial bodies, such as the earth, another planet or the moon, are to be shown on a large scale. Projectors of this type may, however, also be used for other purposes, for instance for outdoor advertising, as the attainable highly stereoscopic impression constitutes an outstanding eye-catcher. This effect is accomplished both on plane projection surfaces and on slightly arcuate projection surfaces, such as the domes of planetaria.

The invention resides in the combination of a tape-like picture carrying medium moved continuously at preferably variable speed and containing a developed representation of the surface of the body of rotation, for example a globe, in the manner of a modified Mercator's projection, with a projection objective which—viewed in opposite direction of the projection light beam—has a strong pin-cushion distortion. The field of view stop provided in, or in the vicinity of, the picture plane is so shaped that it conforms to the visible boundary of the body of rotation.

The unexpectedly strong stereoscopic effect of the image thus projected occurs only upon rotation of the projected image for psychological reasons not to be discussed herein in detail. In the specific case of a planetarium projection, the rate of projection of the rotation to be shown of the celestial body plays a specific role insofar as for the purpose of a simulation of space flights the apparent angular velocity of the rotating celestial body must be adapted to that of the moved planetarium projector (i.e. to the speed of the background of the fixed star sphere) in a manner such that there will be created exactly the impression which presents itself to an astronaut in a space craft. When taking the different orbital possibilities into consideration, namely satellite trajectories ranging from the circular shape to a strongly elongated ellipse and flight paths to other celestial bodies, then the necessity becomes obvious that:

(a) In addition to suitable gearings for the adaption of the angular velocity of the celestial body to that of the fixed stars it is also necessary to employ synchronizing means, and (b) The range of the angular velocity must be relatively great and infinitely variable. For the synchronization, means are used which are known per se, for instance an interlock circuit formed by two function generators, a servo-motor and an amplifier unit.

For the afore-said reasons, the conventional moving picture projectors having a discontinuous film feed are not usable. By way of example, if an increase in speed above the conventional projection speed of 25 partial images per second is required, a limit will very soon make itself manifest which practically cannot be exceeded, the cause of which being the mechanical stress on the film and on the operating elements of the projector. On the other hand, a lower limit of the rate of projection is given by the critical fusion frequency of the human eye.

The projector in accordance with the present invention does not have these disadvantages and is so simple and compact in its construction that it may be combined with an already existing projection planetarium without any difficulties.

If on a flight path the distance between space craft and celestial body changes very substantially, it is advisable to change the image scale by means of a pancratic optical system.

Frequently it is desirable to also impart to the visitors of a planetarium the impression which an astronaut receives when his space craft itself performs a rotation or rolling movement about its path tangent. For the observer sitting in the stationary planetarium this impression may be created by additionally revolving the rotating image of the shown celestial body about the apparent axis of rotation of the assumed space craft synchronously with the movement of the fixed-star sphere. To this end, in accordance with a further feature of the invention, either the entire projector or at least the part comprising the projection lens and the advancing mechanism of the picture carrying member are arranged for rotation about the optical axis of the projection lens and coupled to a drive motor, the rotational speed of which corresponds to the required synchronization or may be adapted thereto.

In the following the operation of the projector will be described in more detail with reefrence to the accompanying drawings, in which.

Figure 1:
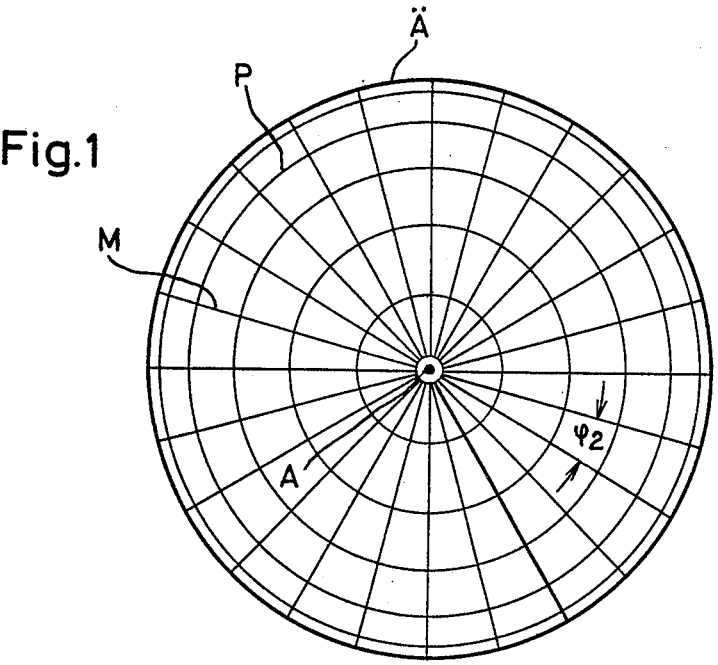
FIG. 1 illustrates a spherical body of which a picture is to be stereoscopically projected.

Referring to the drawings, FIG. 1 illustrates schematically a spherical body, the outer circumferential line of which is the equator Ä having associated therewith a number of concentric circles P. The common point of intersection of the meridian lines M is the one pole through which passes the axis of rotation A of the sphere thus shown in parallel projection.

Figure 2:
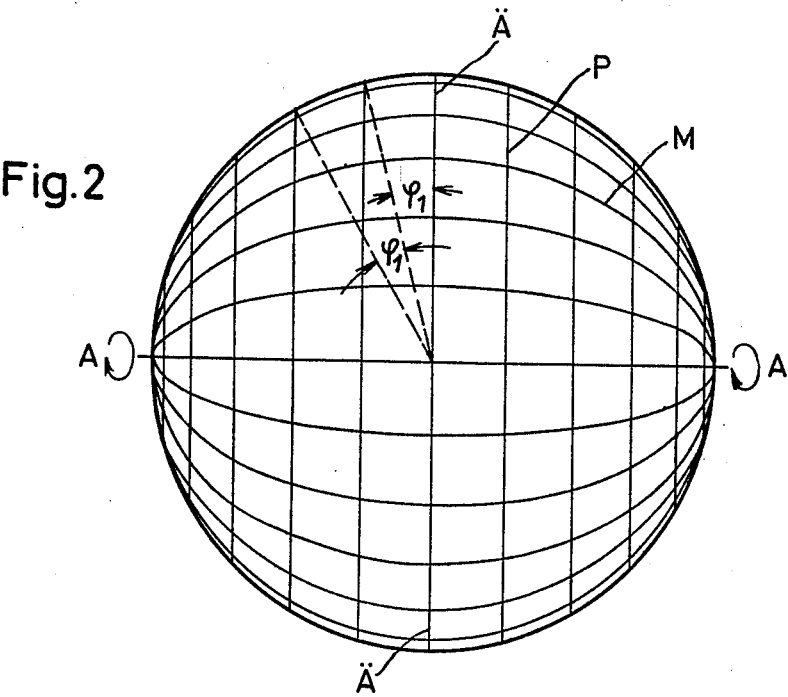
FIG. 2 illustrates the same spherical body rotated 90° about a vertical axis.

FIG. 2 illustrates a parallel projection of the same sphere shown in FIG. 1, but rotated about 90°, wherein the axis of rotation A—A lies in the plane of the drawing, the equator Ä having the greatest diameter with respect to the concentric circles P which appear as straight lines. The meridian lines M have the form of elliptical arcs. The illustrated concentric circles are selected such that the points of intersection of adjacent parallel circles with each meridian from the center of the sphere always appear under the same angle $\varphi_1$. Similarly, the meridian lines are selected such that, as can be seen from FIG. 1, they subtend like angles $\varphi_2$ with each other which, however, need not have any specific relation to the angles $\varphi_1$.

The parallel projections of the FIGS. 1 and 2 correspond to the impression received by the spectator's eye at a relatively great distance, wherein exactly one half of the spherical surface is covered.

Figure 3:
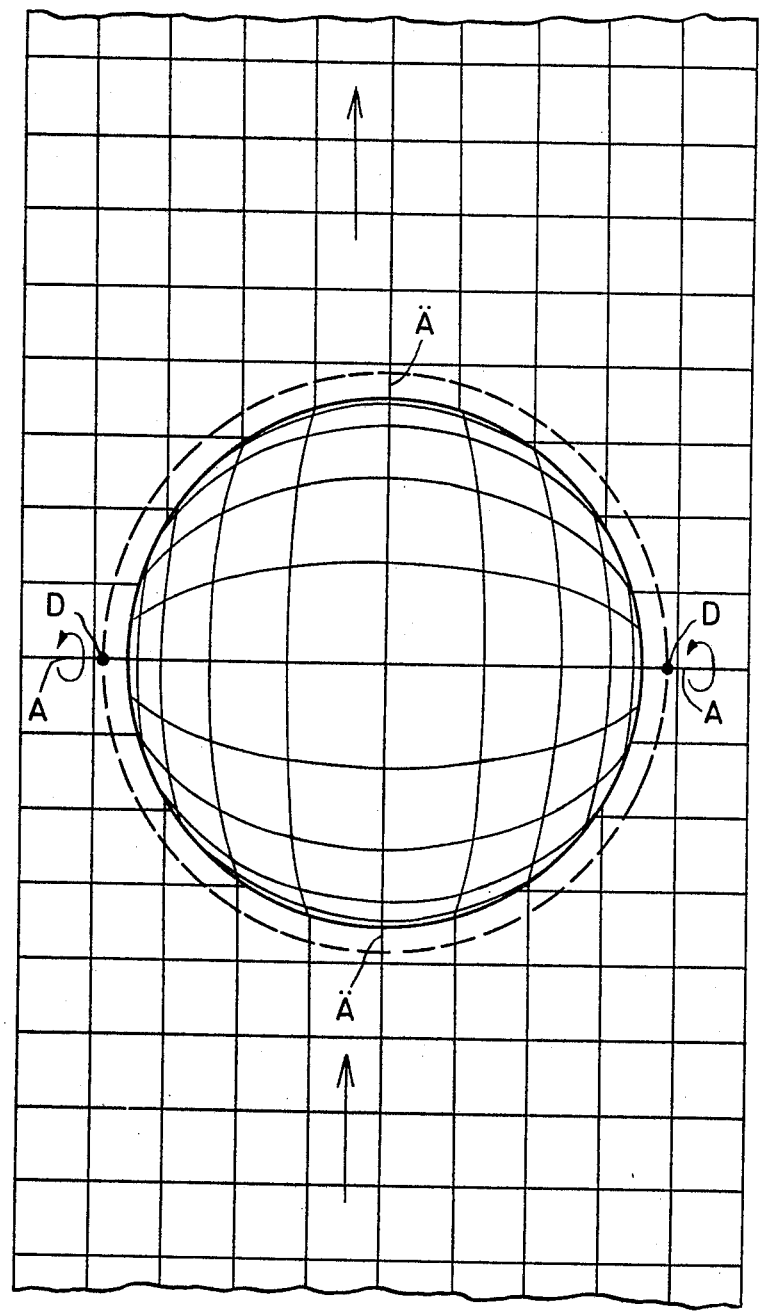
FIG. 3 illustrates the surface of the spherical body developed according to a Mercator's projection and as it is projected by the device of the present invention.

When the observer approaches the sphere, his eyes will take in less than a hemisphere. An example thereof is shown in FIG. 3. The points of intersection D of the axis of rotation A—A, i.e., the poles of the sphere, will then no longer be visible and concentric circles and meridians become elliptical arcs.

FIG. 3 indicates the manner in which the surface of the sphere subdivided by concentric circles and meridian lines is developed onto a rectangular net in the manner of a Mercator's projection. If this representation—transferred to a tape-like picture-carrying medium, such as an endless film strip—is continuously moved in the direction of the arrow past a field step corresponding to the circular boundary line of the visible hemisphere and is projected by a projection objective with a strong pin-cushion distortion, viewed against the direction of the projection light, then the convincing impression of a spherical body with its concentric circles and meridian lines, completely removed from the projection wall, is obtained. Selecting, for instance, the angles $\varphi_1$ and $\varphi_2$ to be of equal size will result in a square net as is illustrated, for example, in FIG. 3. In this connection, it is of no significance that all of the elliptical arcs cannot exactly be illustrated conjointly as straight lines, for surprisingly enough, it has been shown that by the mere use of special lenses with strong pin-cushion distortion such a degree of approximation is attainable tht the described impression will be created.

The projection lenses to be used may be of different constructions. It has been found that projection lenses are particularly efficient which are composed of two parts unsymmetrical with respect to the stop therebetween, whereby said parts comprise at least one meniscus-shaped element each having concavely curved outer surfaces towards the stop. It is, however, also possible to arrange all elements in front of the stop, with their concave outer surfaces facing the stop.

Figure 4:
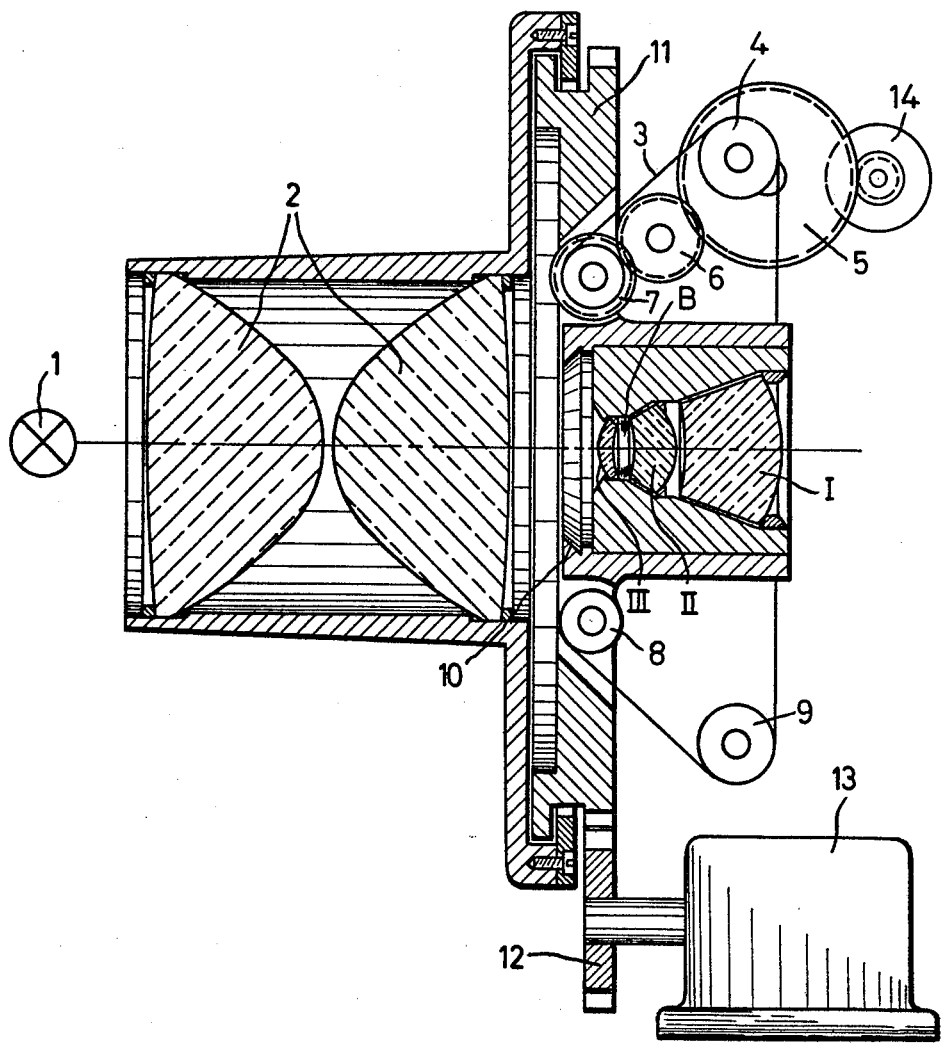
FIG. 4 illustrates diagrammatically and in section a portion of the projection device of the present invention.

FIG. 4 is a partial sectional view of an embodiment of a projector according ot the invention. Behind the light source 1 is arranged a double condenser 2 having a great angle of illumination. The tape-like picture-carrying member 3 is continuously moved between the condenser 2 and the field of view stop 10 which conforms to the visible circumference of the projected image. The carrier member 3 is conveyed by a variable-speed gear mechanism 5, 6 and 7 and rollers 4, 8 and 9.

The schematically illustrated projection objective consists—when viewed against the direction of the light—of the thick positive menisci I, II and III having outer surfaces which are concavely curved with respect to the aperture space. These menisci are arranged unsymmetrically with respect to the stop B and may be split into several elements.

The drive motor 14 for the tape-like picture-carrying member 3 is preferably directly connected with the gear wheel 5. The projector part 11 comprising a ring-shaped plate arranged at right angles to the optical axis of the projection objective I, II, III carries the conveying mechanism for the picture-carrying member 3 and the projection objective. The plate 11 is arranged for rotation about the optical axis of the mentioned projection objective and is adapted to be coupled to a pinion 12 of a drive motor 13.

Figure 5:
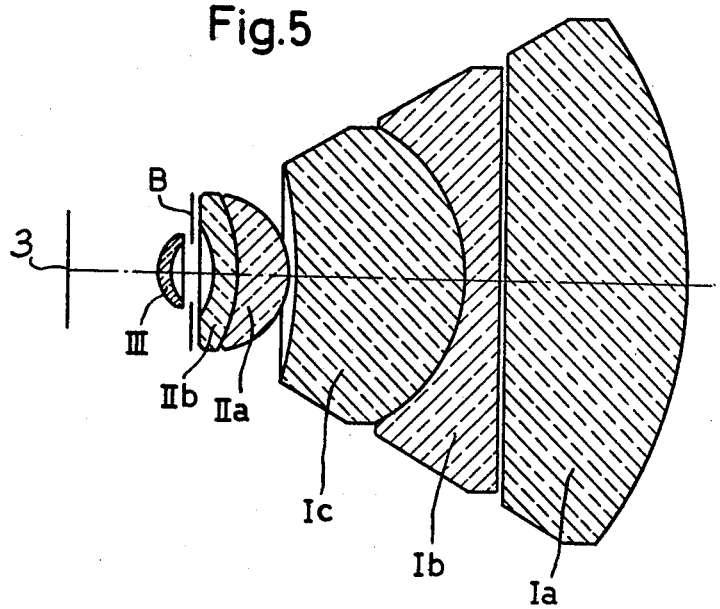
FIGS. 5 and 6 illustrate each a modified projection objective which may be employed in the projection device of FIG. 4.
Figure 6:
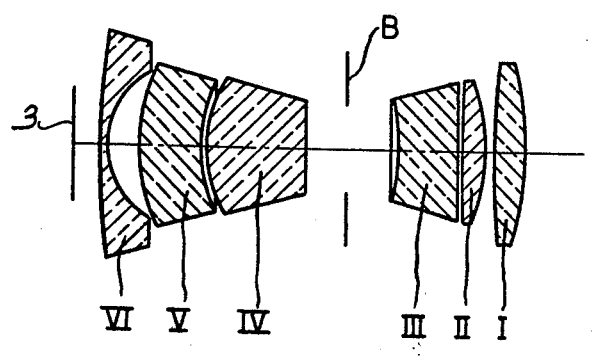

The FIGS. 5 and 6 show two further embodiments of projection lenses with strong pin-cushion distortion, when viewed against the direction of the projection light.

The type of lens illustrated schematically in FIG. 5 is similar to that shown in FIG. 4. The first thick meniscus I—viewed against the direction of light—is split into two elements, namely into a planoconvex positive element Ia and a negative planoconcave element Ib separated from said first element by a plane-parallel air gap. The element Ib is cemented to a thick positive meniscus Ic. The cemented surface subtends an angle of about 130° at the center, thus is strongly curved. Following in the direction toward the stop B, there is arranged another thick meniscus with an air space provided therebetween, said meniscus being comprised of a strongly positive element IIa and a negative meniscus IIb cemented to the element IIa and facing the stop B.

On the opposite side of the stop is arranged a slightly collecting meniscus III which, however, may also be omitted without otherwise necessitating a change as to type.

The type of objective shown in FIG. 6 is not quite as extremely unsymmetrical as is the one shown in FIG. 5. The first element comprises—viewed against the direction of light—an almost symmetrically curved biconvex front lens I followed by a positive meniscus II and, with a small air gap, a thick planoconcave lens III, the latter facing with its concave surface the stop B. Beyond the relatively great aperture space is arranged a thick planoconvex lens IV followed by a thicker weakly negative meniscus V and a strongly negative meniscus VI, the more weakly curved surface of the latter facing the light source.

With distorted lenses of the type indicated, the exact observance of fixed optical data is not of decisive importance. The correction of possibly occurring image aberrations with such lenses does not pose any principal difficulties to an expert in the art.

What we claim is:

1. A device for the stereoscopic representation of revolving bodies of rotation by projection, comprising in combination, a tape-like picture carrying member, a projection objective provided with a field stop at its end facing the picture plane within which the portion of said picture carrying member to be projected is positioned, means for continuously moving said picture carrying member in said picture plane, said picture carrying member carrying a picture of the body of rotation produced in accordance with Mercator's projection, said projection objective producing a strong pin-cushion distortion when viewed in the opposite direction of the passage of the projection light beam passing through said objective, said field stop being arranged closely adjacent said picture plane and being shaped to conform to the outer visible circumference of the picture on said picture carrying member.

2. A device according to claim 1, in which said projection objective comprises two axially separated parts, a second stop between said parts, said parts being unsymmetrical with respect to said second stop and including each at least one meniscus-shaped element having a concave outer surface facing said second stop.

3. A device according to claim 1, in which said projection objective comprises at least two elements, a second stop arranged at the side of said elements facing the field stop, and the surfaces of said elements facing in the direction of the second stop being concavely curved.

4. A device according to claim 1, including means for rotating said projection objective and said means for continuously moving said picture carrying member with said picture carrying member thereon about the optical axis of said projection objective.

5. A device according to claim 1, including a source of light and a condenser, and means for rotating the entire device including said source of light, said condenser, said means for continuously moving said picture carrying member with said picture carrying member thereon and said projection objective about the optical axis of said projection objective.

References Cited

UNITED STATES PATENTS

| | | | |
|---|---|---|---|
| 2,975,670 | 3/1961 | Hemstreet | 353—11 |
| 3,376,381 | 4/1968 | Ratliff, Jr. | 352—86X |
| 3,471,224 | 10/1969 | Ratliff, Jr. | 352—85X |

LOUIS R. PRINCE, Primary Examiner

H. C. POST III, Assistant Examiner

U.S. Cl. X.R.

350—144; 352—43